(12) United States Patent
Dutz et al.

(10) Patent No.: US 12,113,571 B2
(45) Date of Patent: Oct. 8, 2024

(54) COMMUNICATION DEVICE AND OPERATING METHOD

(71) Applicant: NXP B.V., Eindhoven (NL)

(72) Inventors: Jan Dutz, Hart bei Graz (AT); Gert Holler, St. Oswald b. Plankenwarth (AT); Wolfgang Küchler, Graz (AT)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 17/929,181

(22) Filed: Sep. 1, 2022

(65) Prior Publication Data
US 2023/0108844 A1 Apr. 6, 2023

(30) Foreign Application Priority Data
Oct. 6, 2021 (EP) .................................... 21201236

(51) Int. Cl.
*H04B 1/7163* (2011.01)
*H04B 1/16* (2006.01)

(52) U.S. Cl.
CPC ....... *H04B 1/71637* (2013.01); *H04B 1/1638* (2013.01); *H04B 1/7163* (2013.01)

(58) Field of Classification Search
CPC .............. H04B 1/71637; H04B 1/1638; H04B 1/7163; H04B 2201/71634; H04B 1/7183
See application file for complete search history.

(56) References Cited

U.S. PATENT DOCUMENTS

| | | | | |
|---|---|---|---|---|
| 6,055,556 | A * | 4/2000 | Barak | G06F 17/16 708/622 |
| 2005/0069056 | A1 * | 3/2005 | Willingham | H04B 17/21 375/327 |
| 2020/0383052 | A1 * | 12/2020 | Zhou | H04W 52/0238 |
| 2022/0107388 | A1 * | 4/2022 | Vallee | G01S 7/032 |
| 2022/0416828 | A1 * | 12/2022 | Quinlan | H04B 1/18 |
| 2023/0065673 | A1 * | 3/2023 | Tertinek | G01S 3/46 |

FOREIGN PATENT DOCUMENTS

| | | | | |
|---|---|---|---|---|
| AU | 2014405866 A1 * | 3/2017 | ........... | H03D 7/1466 |
| EP | 3978948 A1 * | 4/2022 | ............ | G01S 13/34 |

OTHER PUBLICATIONS

Machine Translation of WO-2022075151-A1 (Year: 2022).*
Armstrong, E., "Some Recent Developments of Regenerative Circuits", Presented before The Institute of Radio Engineers, New York, Jun. 7, 1922.

(Continued)

*Primary Examiner* — Jean B Corrielus

(57) ABSTRACT

In accordance with a first aspect of the present disclosure, a communication device is provided, comprising: a receiver circuit configured to receive a signal; a controller configured to control said receiver circuit, wherein said controller is configured to cause said receiver circuit to operate either in a complex receiver mode or in a real receiver mode; wherein the controller is configured to cause said receiver circuit to operate in the real receiver mode until the signal is successfully acquired. In accordance with a second aspect of the present disclosure, a corresponding method of operating a communication device is conceived.

20 Claims, 10 Drawing Sheets

200

202
Receiving, by a receiver circuit comprised in a communication device, a signal 204
Controlling, by a controller comprised in the communication device, the receiver circuit, wherein the controller causes said receiver circuit to operate either in a complex receiver mode or in a real receiver mode, wherein the controller causes said receiver circuit to operate in the real receiver mode until the signal is successfully acquired

(56) References Cited

OTHER PUBLICATIONS

Barras, D., "A Low-Power Baseband ASIC for an Energy-Collection IR-UWB Receiver", IEEE Journal of Solid-State Circuits, vol. 44, No. 6, Jun. 2009.

Demirkol, C., "Wake-up Receivers for Wireless Sensor Networks: Benefits and Challenges", IEEE Wireless Communications, Aug. 2009.

Joehl, N., "A Low-Power 1-GHz Super-Regenerative Transceiver with Time-Shared PLL Control", IEEE Journal of Solid-State Circuits, vol. 36, No. 7, Jul. 2001.

Losada, M., "Performance of an IEEE 802.15.4a Ranging System in Multipath Indoor Environments", 2011 IEEE International Conference on Ultra-Wideband (ICUWB), Sep. 14-16, 2011.

Magno, M., "An Ultra Low Power High Sensitivity Wake-Up Radio Receiver with Addressing Capability", 2014 The Second International Workshop on Green Optimized Wireless Networks, Oct. 8-10, 2014.

Ramin, M., "Timing Synchronization in Impulse-Radio UWB: Trends and Challenges", 2008 Joint 6th International IEEE Northeast Workshop on Circuits and Systems and TAISA Conference, Jun. 22-25, 2008.

\* cited by examiner

COMMUNICATION DEVICE AND OPERATING METHOD

CROSS-REFERENCE TO RELATED APPLICATIONS

This application claims the priority under 35 U.S.C. § 119 of European Patent application no. 21201236.3, filed on 6 Oct 2021, the contents of which are incorporated by reference herein.

TECHNICAL FIELD

The present disclosure relates to a communication device. Furthermore, the present disclosure relates to a corresponding method of operating a communication device.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

SUMMARY

In accordance with a first aspect of the present disclosure, a communication device is provided, comprising: a receiver circuit configured to receive a signal; a controller configured to control said receiver circuit, wherein said controller is configured to cause said receiver circuit to operate either in a complex receiver mode or in a real receiver mode; wherein the controller is configured to cause said receiver circuit to operate in the real receiver mode until the signal is successfully acquired.

In one or more embodiments, the controller is further configured to cause the receiver circuit to use, in the complex receiver mode, an I-channel and a Q-channel of the received signal.

In one or more embodiments, the controller is further configured to cause the receiver circuit to use, in the real receiver mode, only said I-channel of the received signal or only said Q-channel of the received signal.

In one or more embodiments, the controller is further configured to apply, when the receiver circuit operates in the real receiver mode, a local oscillator frequency which is different from the local oscillator frequency applied when the receiver operates in the complex receiver mode.

In one or more embodiments, the controller is further configured to switch the receiver circuit from the real receiver mode to the complex receiver mode upon or after a successful acquisition of the signal.

In one or more embodiments, the successful acquisition of the signal is based on the detection of a synchronization field within said signal, wherein the synchronization field is included in a data frame.

In one or more embodiments, the controller is further configured to wake up the receiver circuit before switching the receiver circuit from the real receiver mode to the complex receiver mode.

In one or more embodiments, the controller is further configured to wake up the receiver circuit after switching the receiver circuit from the real receiver mode to the complex receiver mode.

In one or more embodiments, the controller is further configured to reset a center frequency upon or after switching the receiver circuit from the real receiver mode to the complex receiver mode.

In one or more embodiments, the receiver circuit is configured to operate in the complex receiver mode by default, and the controller is configured to switch the receiver circuit from the complex receiver mode to the real receiver mode if no signal is found within a predefined amount of time after the receiver circuit has started up.

In one or more embodiments, the device is an ultra-wideband (UWB) communication node acting as a responder in a communication system.

In accordance with a second aspect of the present disclosure, a method of operating a communication device is conceived, wherein the communication device comprises a receiver circuit and a controller, the method comprising: receiving, by the receiver circuit, a signal; controlling, by the controller, the receiver circuit; wherein the controller causes said receiver circuit to operate either in a complex receiver mode or in a real receiver mode; wherein the controller causes said receiver circuit to operate in the real receiver mode until the signal is successfully acquired.

In one or more embodiments, the controller causes the receiver circuit to use, in the complex receiver mode, an I-channel and a Q-channel of the received signal.

In one or more embodiments, the controller causes the receiver circuit to use, in the real receiver mode, only said I-channel of the received signal or only said Q-channel of the received signal.

In one or more embodiments, the controller applies, when the receiver circuit operates in the real receiver mode, a local oscillator frequency which is different from the local oscillator frequency applied when the receiver operates in the complex receiver mode.

DESCRIPTION OF DRAWINGS

Embodiments will be described in more detail with reference to the appended drawings, in which.

DESCRIPTION OF EMBODIMENTS

Figure 1:
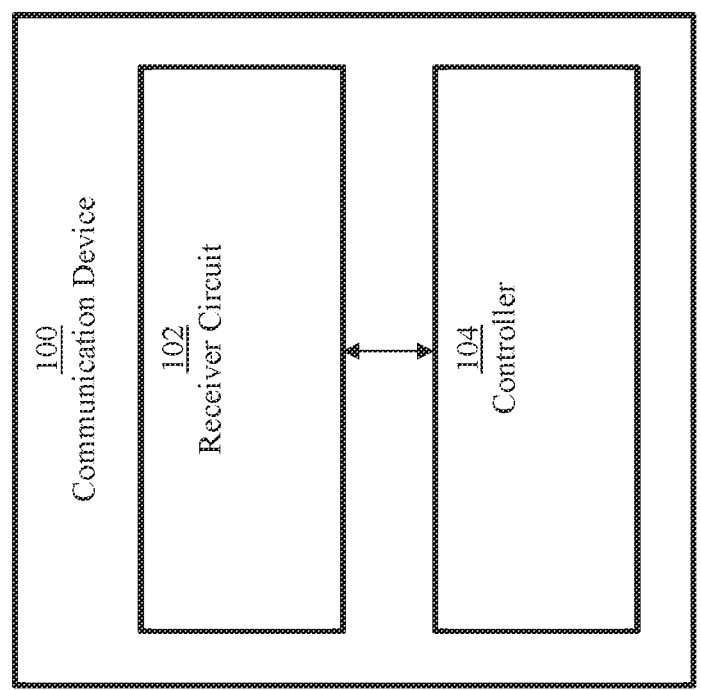
FIG. 1 shows an illustrative embodiment of a communication device.

As mentioned above, UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e. for determining the distance between communicating devices. Therefore, UWB technology may be used to advantage in various applications, such as automotive applications.

UWB communication devices may have a relatively high power or current consumption. This is especially true for a responding transceiver ("responder"), when the timing relationship to an initiating transceiver ("initiator") is not established. The responder will be in a constant receive mode for a potentially long time period, waiting for the first frame. In particular, high performance UWB receivers tend to have high current consumption in the receive mode. This is mainly caused by an analog-to-digital converter (ADC) sampling rate and digital processing rate in the 1 GHz frequency range, by a 500 MHz bandwidth of the analog frontend, and by a local oscillator (LO) distribution in the 10 GHz frequency range. Two quadrature receive (Rx) paths are used to guarantee optimal reception, even if the LO phases of the sender and receiver are not phase aligned. The bill of materials (BOM) and size of a UWB communication device are typically determined by the current consumption in a constant Rx mode.

A transceiver typically contains a signal transmission function or signal transmission unit (i.e., a transmitter) and a signal receiving function or signal receiving unit (i.e., a receiver). The receiver is capable of receiving a radio frequency (RF) signal. Receivers are often based on an IQ topology. It is noted that, according to the IQ topology, a received signal is divided into an I-component or I-channel and a Q-component or Q-channel. The I-channel is the received RF signal without a phase shift (i.e., the "in-phase" or reference signal), while the Q-channel is the received signal shifted by 90 degrees (i.e., the received signal in quadrature). In practice, the RF signal is typically mixed with two sinusoids (i.e. LO outputs), where one sinusoid has a pi/2 phase offset relative to the other sinusoid. If only the I-channel is enabled, the receiver effectively operates in a real receiver mode, while if both the I-channel and the Q-channel are enabled, the receiver effectively operates in a complex receiver mode. Alternatively, the receiver may effectively operate in the real receiver mode if only the Q-channel is enabled.

Now discussed are a communication device and a corresponding method of operating a communication device, which facilitate reducing the power consumption of said device, and consequently reducing the bill of materials and size of the communication device.

FIG. 1 shows an illustrative embodiment of a communication device 100. The communication device 100 comprises a receiver circuit 102 and a controller 104 which are operatively coupled to each other. The receiver circuit 102 is configured to receive a signal from an external communication device (not shown). Furthermore, the controller 104 is configured to control said receiver circuit 102, wherein said controller 104 is configured to cause said receiver circuit 102 to operate either in a complex receiver mode or in a real receiver mode. More specifically, the controller 104 is configured to cause said receiver circuit 102 to operate in the real receiver mode until the signal is successfully acquired. In particular, it may be sufficient to operate the receiver circuit 102 in the real receiver mode if the signal has not yet been acquired successfully. Since the real receiver mode requires less power than the complex receiver mode, the power consumption of the communication device 100 may be reduced significantly.

In one or more embodiments, the controller is further configured to cause the receiver circuit to use, in the complex receiver mode, an I-channel and a Q-channel of the received signal. In this way, a practical implementation of the complex receiver mode may be realized. Furthermore, in one or more embodiments, the controller is further configured to cause the receiver circuit to use, in the real receiver mode, only said I-channel of the received signal or only said Q-channel of the received signal. In this way, a practical implementation of the real receiver mode may be realized.

In one or more embodiments, the controller is further configured to apply, when the receiver circuit operates in the real receiver mode, a local oscillator frequency which is different from the local oscillator frequency applied when the receiver operates in the complex receiver mode. For example, the controller may be configured to offset, when the receiver circuit operates in the real receiver mode, the local oscillator frequency of the receiver circuit by a fraction of the chip rate. In this way, the reception of the signal is facilitated, such that the signal can be properly acquired. It is noted that a chip is equivalent to a UWB pulse. Accordingly, the transmission rate of the pulses may be referred to as the chip rate. The maximal transmission rate is defined in the IEEE 14.5 HRP standard as 499.2 MHz. In one or more embodiments, the controller is further configured to switch the receiver circuit from the real receiver mode to the complex receiver mode upon or after a successful acquisition of the signal. In this way, the receiver circuit may perform at full performance when the signal has been acquired and the contents of the signal should be processed. Furthermore, in one or more embodiments, the successful acquisition of the signal is based on the detection of a synchronization field within said signal, wherein the synchronization field is included in a data frame. In this way, it can easily be determined whether the signal has been successfully acquired.

In one or more embodiments, the controller is further configured to wake up the receiver circuit before switching the receiver circuit from the real receiver mode to the complex receiver mode. This may be advantageous in some implementations of the communication device. Alternatively, the controller is further configured to wake up the receiver circuit after switching the receiver circuit from the real receiver mode to the complex receiver mode. This may be advantageous in other implementations of the communication device. Furthermore, in one or more embodiments, the controller is configured to reset a center frequency upon or after switching the receiver circuit from the real receiver mode to the complex receiver mode. This has the advantage that a data part of a first frame may be received with full sensitivity. In one or more embodiments, the receiver circuit is configured to operate in the complex receiver mode by default, and the controller is configured to switch the receiver circuit from the complex receiver mode to the real receiver mode if no signal is found within a predefined amount of time after the receiver circuit has started up. This may be advantageous in systems in which a wake-up event is triggered via a separate interface.

Figure 2:
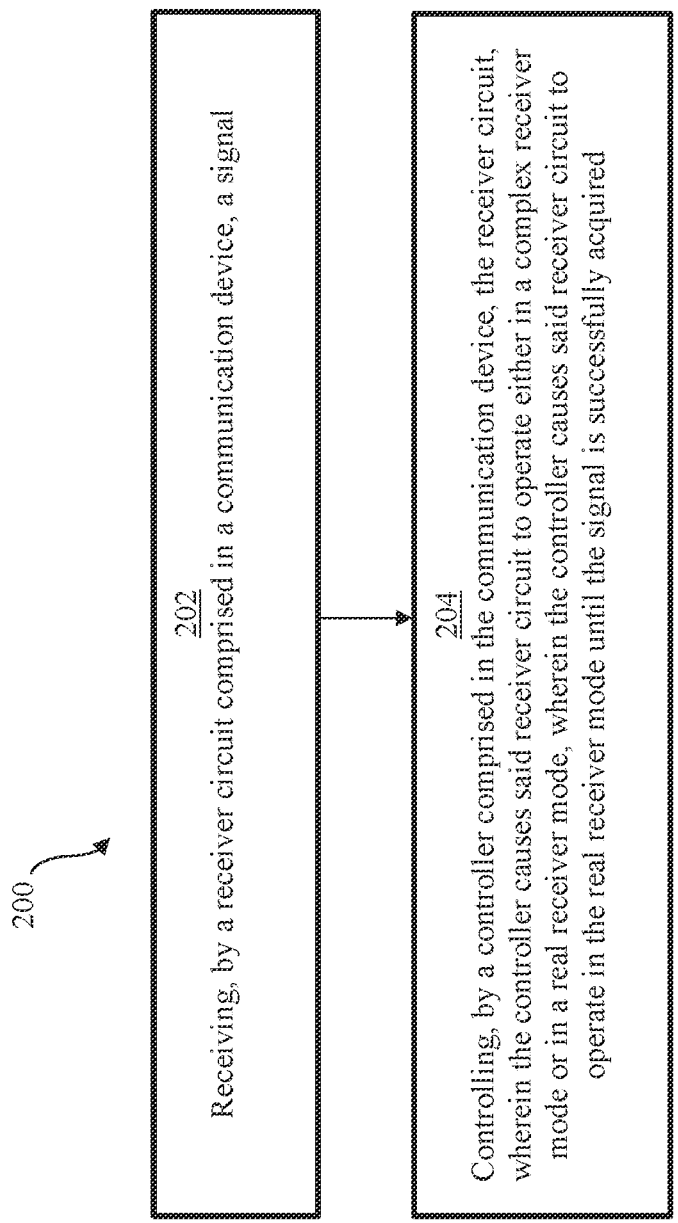
FIG. 2 shows an illustrative embodiment of a method of operating a communication device.

FIG. 2 shows an illustrative embodiment of a method 200 of operating a communication device. The method 200 comprises the following steps. At 202, a receiver circuit comprised in a communication device receives a signal. More specifically, the receiver circuit receives a signal from an external communication device. Furthermore, at 204, a controller comprised in the communication device controls the receiver circuit, wherein the controller causes said receiver circuit to operate either in a complex receiver mode or in a real receiver mode. More specifically, the controller causes said receiver circuit to operate in the real receiver mode until the signal is successfully acquired. As explained above, it may be sufficient to operate the receiver circuit in the real receiver mode if the signal has not yet been acquired successfully. Since the real receiver mode requires less power than the complex receiver mode, the power consumption of the communication device may be reduced significantly.

Accordingly, only one of the two quadrature Rx paths may be enabled during acquisition, to reduce the current consumption by approximately 50% in this mode. Furthermore, the local oscillator (LO) frequency of the RX may be offset by a carrier frequency offset (CFO) that is a fraction of the chip rate (e.g. ⅛, ¼, ½ of 499.2 MHz). Then, the second quadrature component may be enabled once acquisition was successful. The digital receiver may be capable of receiving the frame with said CFO. This method may be compatible with different ranging protocols, such as the protocols defined by the Institute of Electrical and Electronics Engineers (IEEE), the Car Connectivity Consortium (CCC) and the FiRa Consortium.

Figure 3:
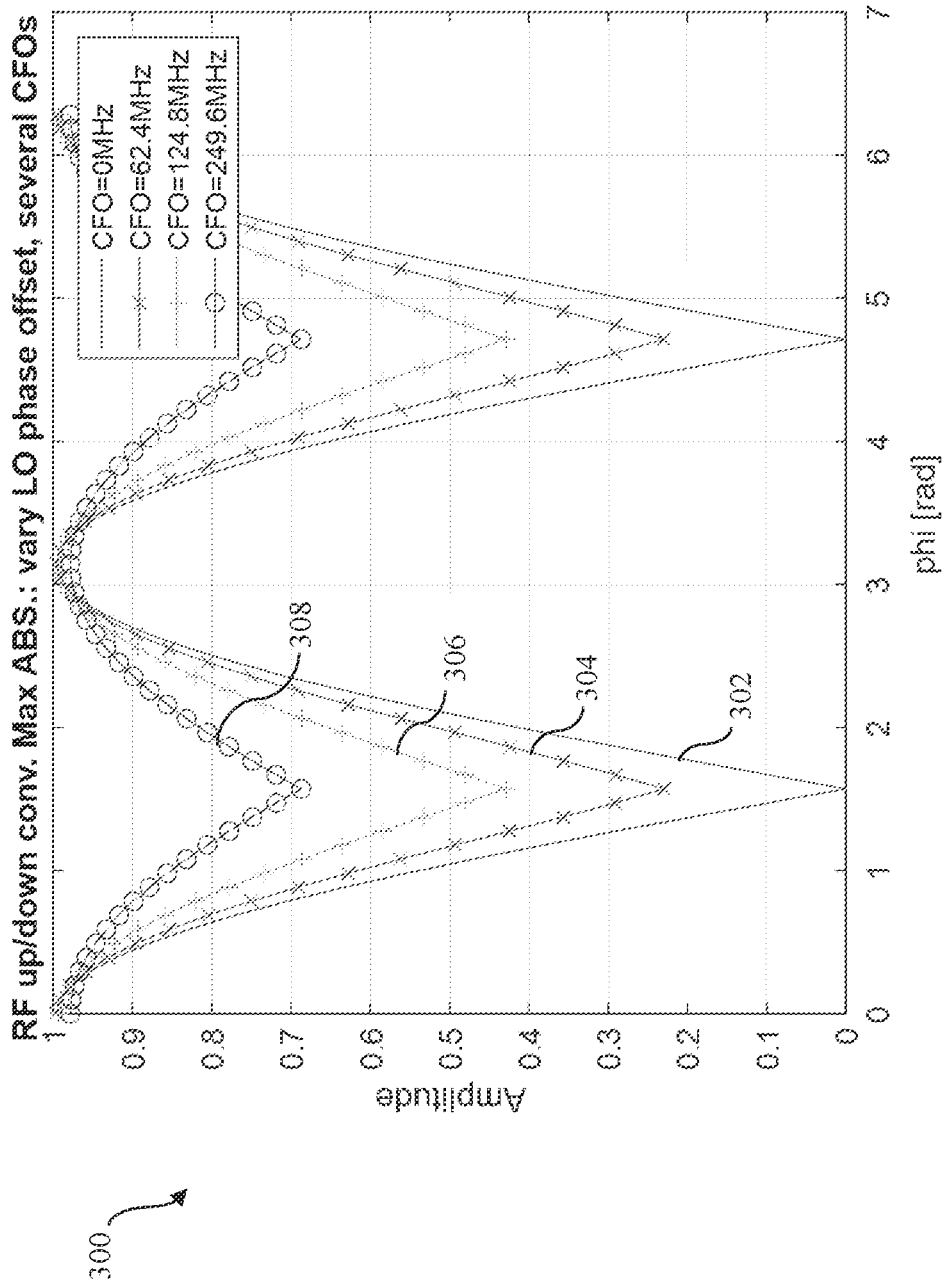
FIG. 3 shows a maximum amplitude of an I-component relative to an LO phase offset for several carrier frequency offsets (CFOs)

FIG. 3 shows a maximum amplitude 300 of an I-component relative to an LO phase offset for several carrier frequency offsets (CFOs). It is noted that the LO phase offset is a frequency offset between the receiver (RX) and the transmitter (TX). UWB receivers typically use an in-phase component (i.e., an I-component) and a quadrature component (i.e., a Q-component). As mentioned above, the RF signal is typically mixed with two sinusoids (i.e. LO outputs), where one sinusoid has a pi/2 phase offset relative to the other sinusoid. Line 302 shows a regular case with no frequency offset. Then, the amplitude highly depends on the phase offset between the LOs. In particular, the amplitude varies between the limits of 0 and pi and vanishes at pi/2 and 3pi/2. If there is no frequency offset, then the possibility of a proper signal reception with only the I-component depends on the phase between the LOs, even when the link budget is good. As mentioned above, to facilitate the signal reception, the controller may be configured to offset, when the receiver circuit operates in the real receiver mode (i.e., when only the I-component is enabled), the local oscillator frequency of the receiver circuit by a fraction of the chip rate. Line 306 shows an example of such an offset. More specifically, line 306 shows a frequency offset by ¼ of the chip rate. In that case, the amplitude still depends on the LO phase offset and the minimum is approximately 42% of the maximum (i.e., the performance loss is approximately 7.5 dB). Thus, if there is a frequency offset, then independently of the phase between the LOs a proper signal reception with the I-component alone is possible.

Figure 4:
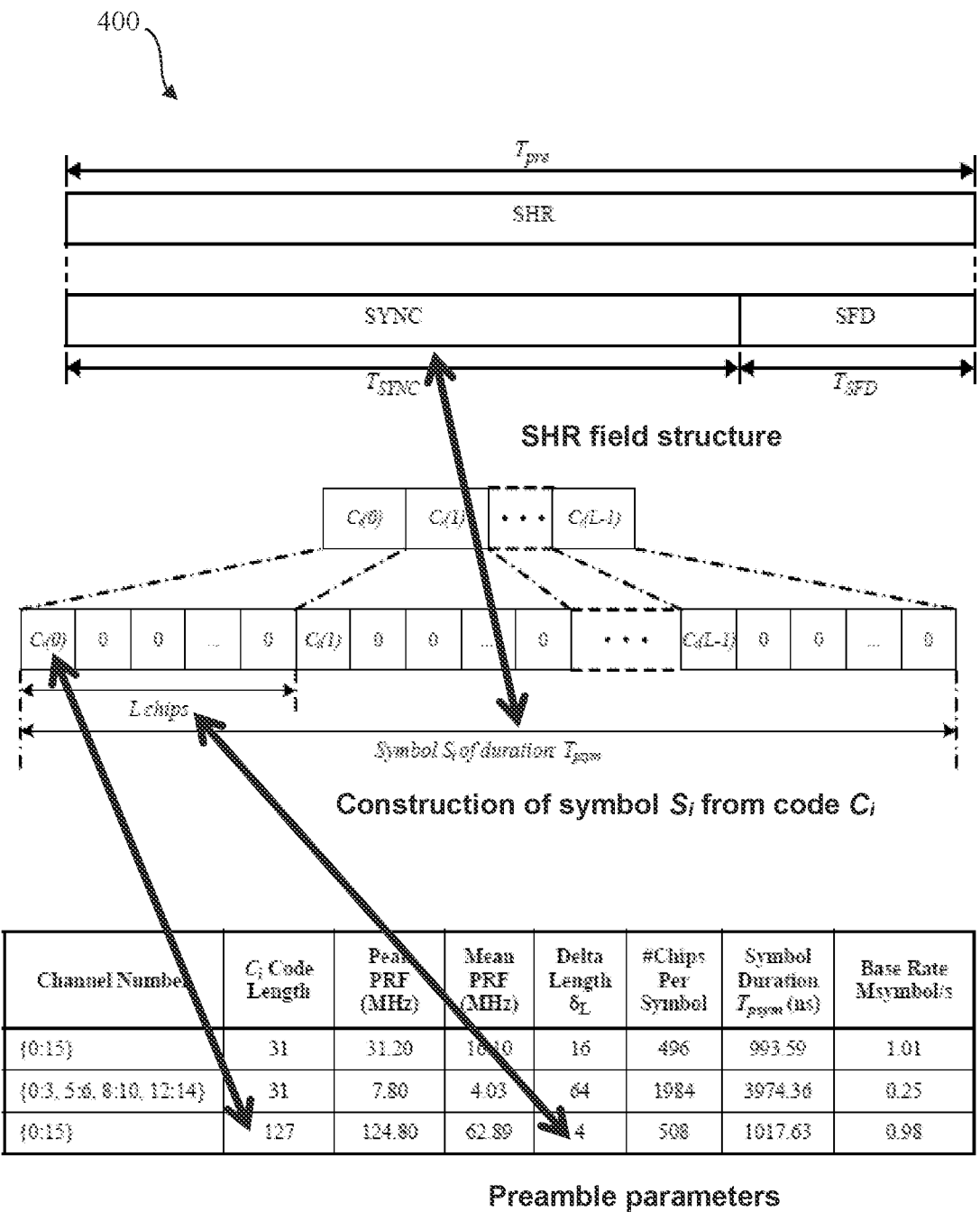
FIG. 4 shows an illustrative embodiment of a field structure of a preamble.

FIG. 4 shows an illustrative embodiment of a field structure of a preamble 400. In particular, this field structure is specified in the technical standard "IEEE Standard for Low-Rate Wireless Networks", IEEE Std 802.15.4-2020 (Revision of IEEE Std 802.15.4-2015), 23 Jul. 2020, doi: 10.1109/IEEESTD.2020.9144691. In order to receive a frame, the receiver circuit should acquire the frequency and time offset from the SYNC field. The SYNC field consists of a repetition of equal symbols. Each symbol consists of a binary sequence (Ci) upsampled by a value "DeltaL". For instance, the value DeltaL=4 is typically used for a pulse repetition frequency (PRF) of 62.89 MHz. It is noted that the UWB signal amplitudes can be below the noise floor at the receiver circuit. The receiver circuit typically employs correlation to recover the signal. The correlation is sensitive to frequency offsets and small offsets in the range of 10 s of ppm can destroy the signal. However, due to the upsampling by DeltaL the correlation works well at frequency offsets that are a multiple of 1/DeltaL of the chip rate. For instance, if DeltaL=4 frequency offsets of a multiple of 124.8 MHz may be applied, if DeltaL=16 frequency offsets of a multiple of 31.2 MHz may be applied, and if DeltaL=64 frequency offsets of a multiple of 7.8 MHz may be applied.

Figure 5:
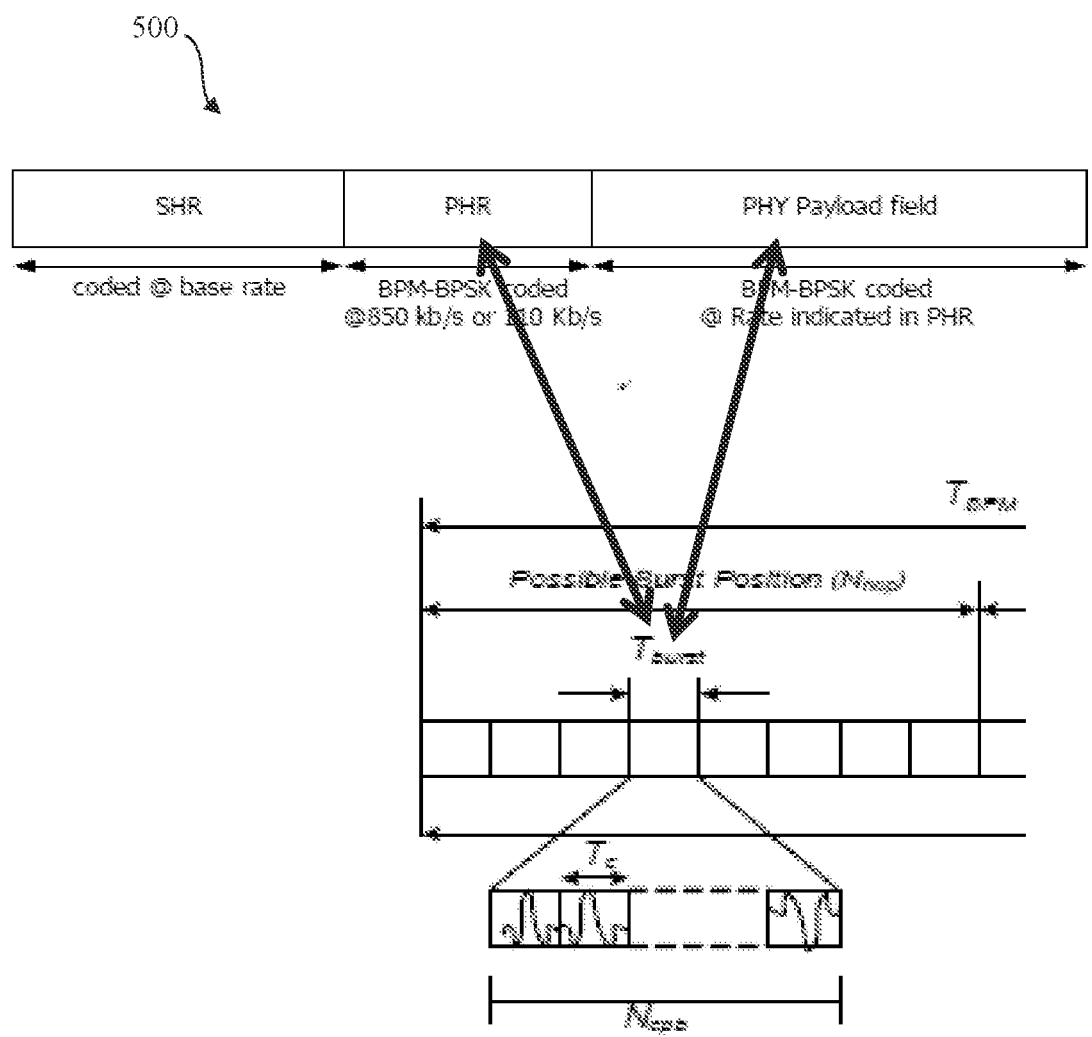
FIG. 5 shows an illustrative embodiment of a field structure of a full frame.

FIG. 5 shows an illustrative embodiment of a field structure of a full frame 500. In particular, this field structure is specified in the technical standard "IEEE Standard for Low-Rate Wireless Networks", IEEE Std 802.15.4-2020 (Revision of IEEE Std 802.15.4-2015), 23 Jul. 2020, doi: 10.1109/IEEESTD.2020.9144691. For a wake up receiver it may be important that it can also receive the data part (containing a physical layer packet header (PHR) and a PHY payload) of a frame, in order to comply with existing protocols, such as the protocols defined by the IEEE, CCC and FiRa Consortium, and in order to start the ranging protocol with the first frame. The data part is typically modulated with a higher maximal chip rate than the synchronization header (SHR). The IEEE 15.4z standard defines two options, i.e. a burst with back-to-back chips and a burst with guard chips. As mentioned above, a chip is equivalent to a UWB pulse. In FIG. 5, the time period Tc indicates the duration of one chip. Accordingly, the digital receiver may have to be designed to receive the PHR and payload of a frame with a CFO that is a fraction of the maximal chip rate.

Figure 6:
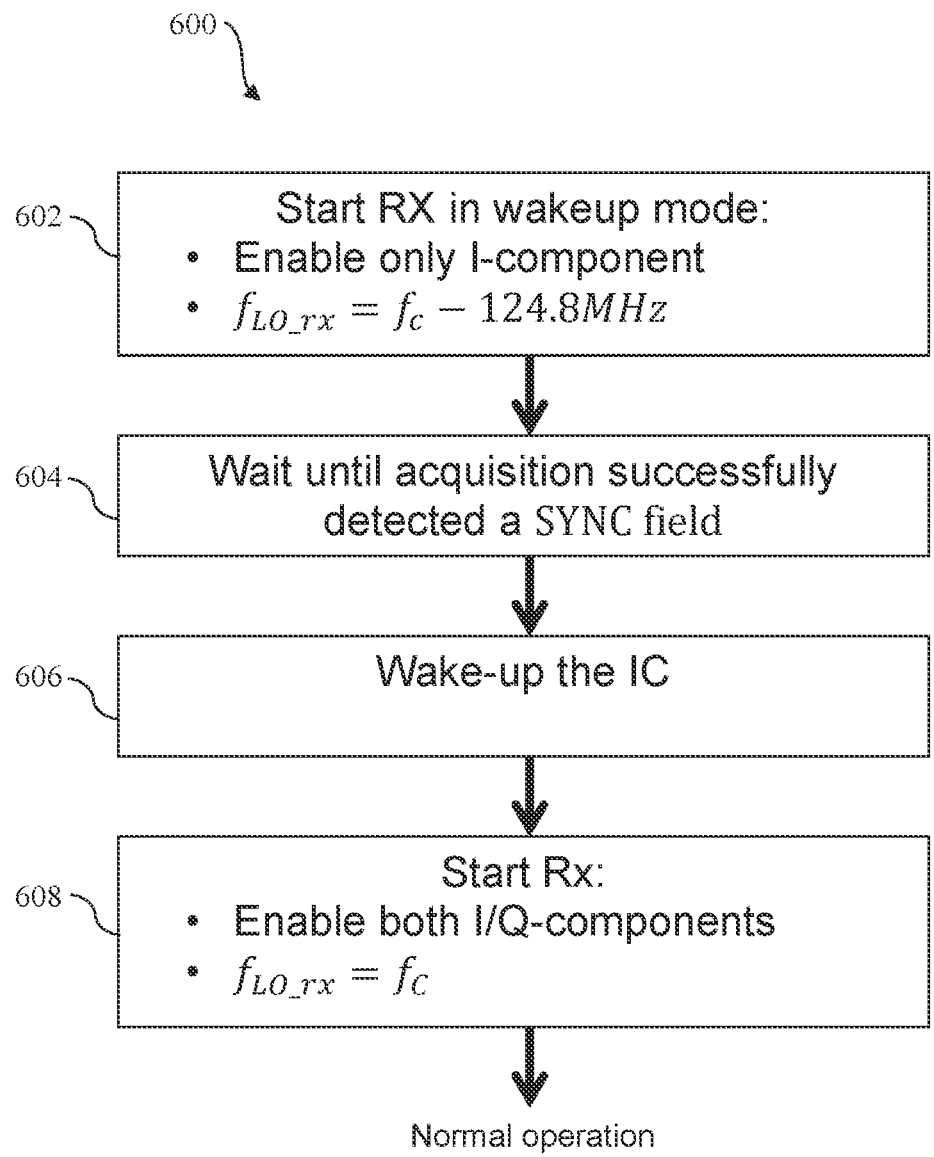
FIG. 6 shows an illustrative embodiment of a first procedure for operating a receiver circuit.

FIG. 6 shows an illustrative embodiment of a first procedure 600 for operating a receiver circuit. In particular, in accordance with the present disclosure, the receiver circuit operates in the real receiver mode (i.e., using only the I-channel or I-component) until a signal is successfully acquired. In the example shown in FIG. 6, this is implemented in the following manner. At 602, the receiver circuit is started in a wake-up mode, in which only the I-component is enabled, with a certain frequency offset, to detect the SYNC field for any phase offset between TX and RX. At 604, the controller waits until a SYNC field is detected. As mentioned above, the successful acquisition of the signal may be based on the detection of a synchronization (SYNC) field within the signal. Thus, the reception of the SYNC field of the first frame may wake up 606 the device, and the data part of the frame may be ignored. After the device has woken up, the receiver circuit may be started 608 and both the I-component and the Q-component may be enabled. Accordingly, the following frames are received with full receiver performance. This procedure is most suited for systems in which a transmitter sends wake-up frames at regular intervals, and in which it is not critical that the receiver receives the payload of the first frame. For example, for a wearable smart tag the response time is not critical.

Figure 7:
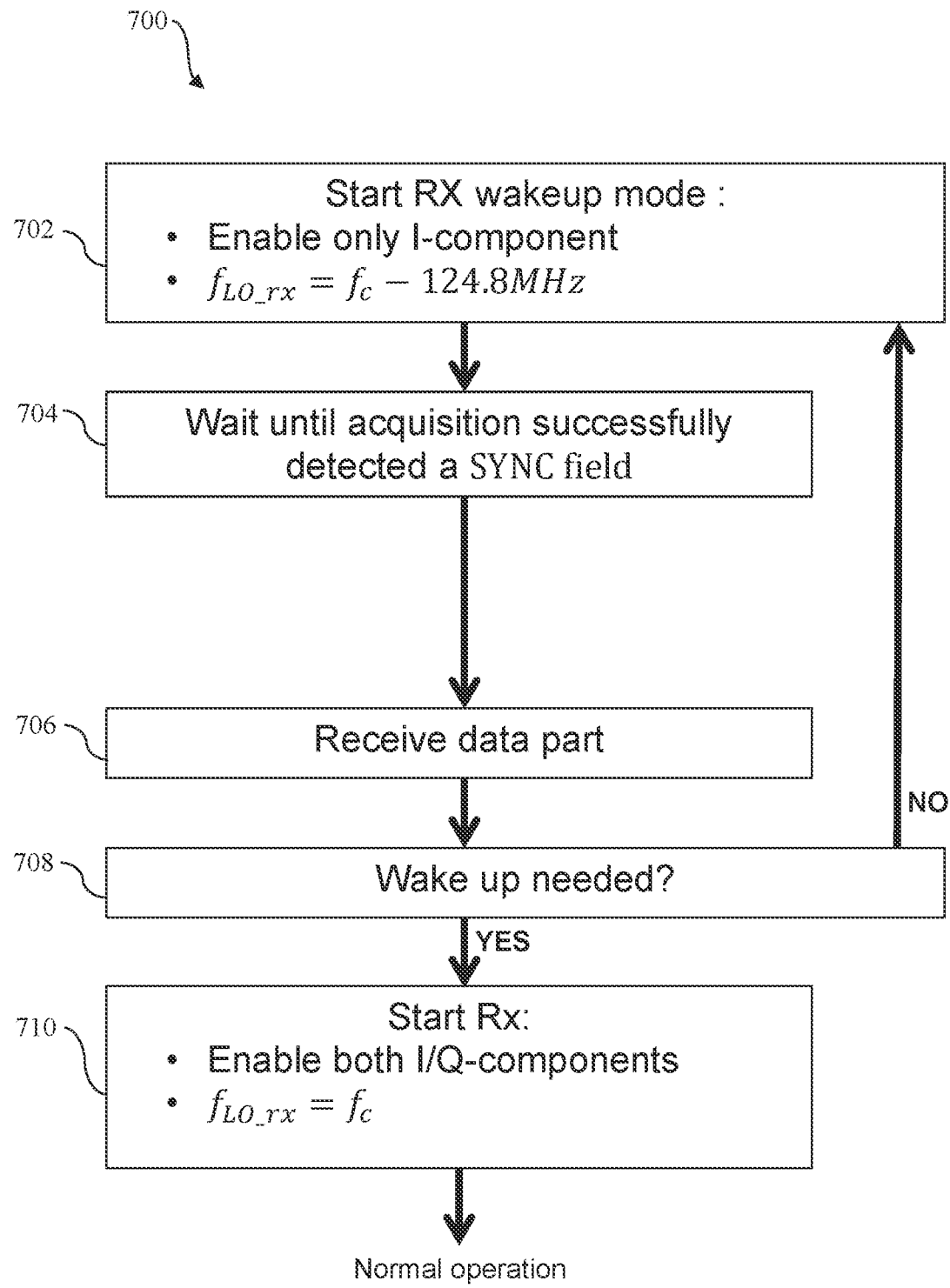
FIG. 7 shows an illustrative embodiment of a second procedure for operating a receiver circuit.

FIG. 7 shows an illustrative embodiment of a second procedure 700 for operating a receiver circuit. In particular, in accordance with the present disclosure, the receiver circuit operates in the real receiver mode (i.e., using only the I-channel or I-component) until a signal is successfully acquired. In the example shown in FIG. 7, this is implemented in the following manner. At 702, the receiver circuit is started in a wake-up mode, in which only the I-component is enabled, with a certain frequency offset, to detect the SYNC field for any phase offset between TX and RX. More specifically, the SYNC field of the first frame as well as the data part of the first frame is received. At 704, the controller waits until a SYNC field is detected. As mentioned above, the successful acquisition of the signal may be based on the detection of a synchronization (SYNC) field within the signal. The data part of the first frame is received 706; this data part may indicate that a wake-up of the receiver circuit is needed. In particular, a wake-up is performed if indicated by the data part (e.g., a destination address matches and a ranging exchange is started). Accordingly, the receiver circuit is started 710 and both the I-component and the Q-component may be enabled. Then, the following frames are received with full receiver performance. This procedure is most suited for systems in which it is important that the receiver receives the payload of the first frame. For instance, in an access system the user may benefit from a fast response. Furthermore, in a battery-powered application energy is conserved, if the device only wakes up on frames that are intended for the device.

Figure 8A:
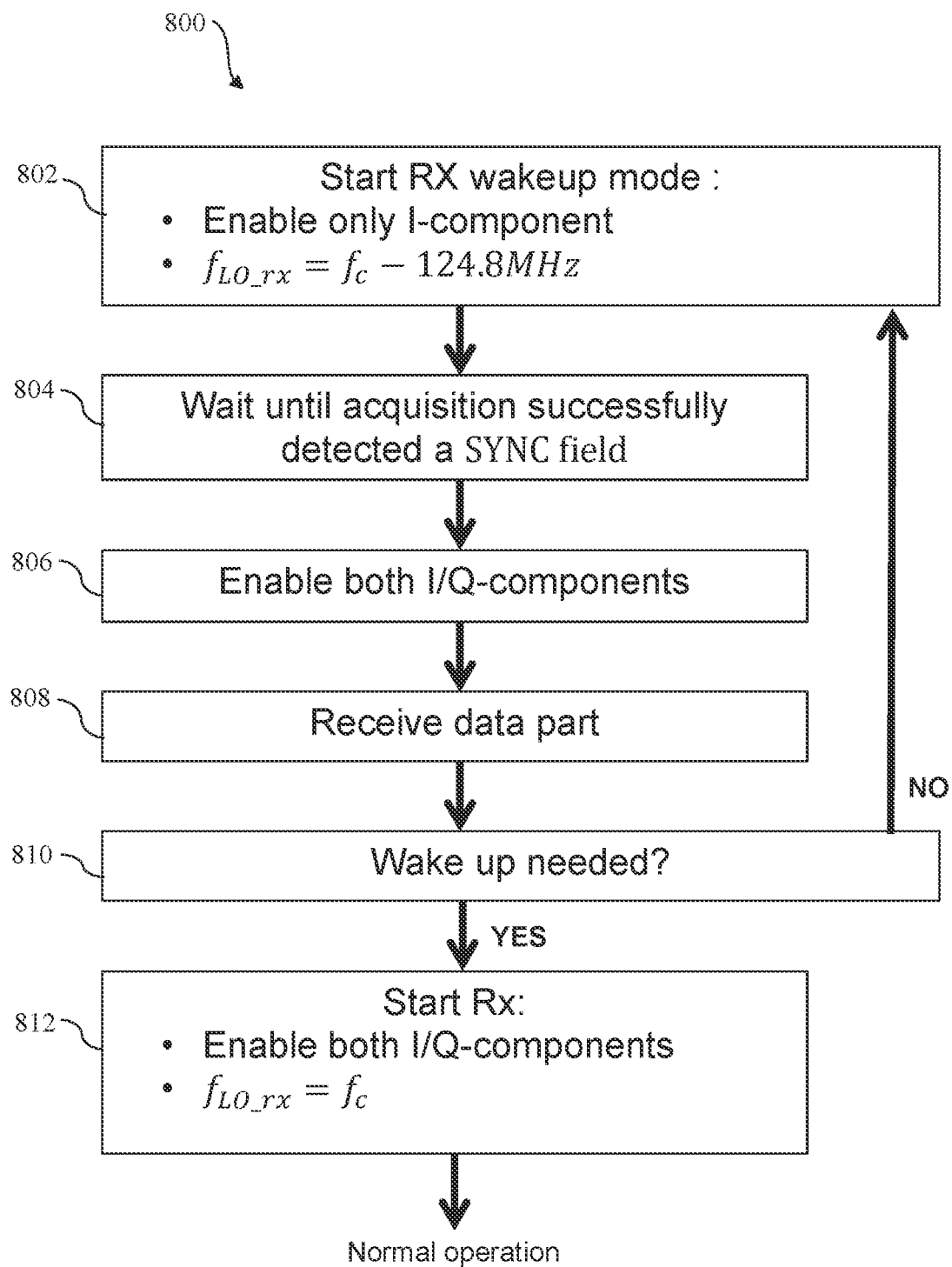
FIG. 8A shows an illustrative embodiment of a third procedure for operating a receiver circuit.

FIG. 8A shows an illustrative embodiment of a third procedure 800 for operating a receiver circuit. In particular, in accordance with the present disclosure, the receiver circuit operates in the real receiver mode (i.e., using only the I-channel or I-component) until a signal is successfully acquired. In the example shown in FIG. 8A, this is implemented in the following manner. At 802, the receiver circuit is started in a wake-up mode, in which only the I-component is enabled, with a certain frequency offset, to detect the SYNC field for any phase offset between TX and RX. At 804, the controller waits until a SYNC field is detected. As mentioned above, the successful acquisition of the signal may be based on the detection of a synchronization (SYNC) field within the signal. Then, at 806, both the I-component and the Q-component are enabled. Thus, in this example, the wake-up is performed using only the I-component, but the data part of the first frame is received using both the I-component and the Q-component. In this sense, it may be said that the receiver circuit is started in a wake-up mode using only the I-component, however with immediate data reception using both quadrature branches. More specifically, the reception of the SYNC field of the first frame partly wakes up the device, the Q-component is enabled immediately, such that the data part of the first frame is received 808 with both quadrature branches enabled and a nominal LO frequency offset. A full wake-up is performed if the data part indicates that a wake-up is needed 810 (e.g., a destination address matches and a ranging exchange is started). Accordingly, the receiver circuit is started 812 and both the I-component and the Q-component may be enabled. Then, the following frames are received with full receiver performance without a nominal LO frequency offset. This procedure is most suited for systems in which it is important that the receiver receives the payload of the first frame. Compared to the second procedure described above, the performance of the data reception is enhanced. This may be beneficial in an access system, in which the user benefits from a fast response. Furthermore, in a battery-powered application energy is conserved, if the device only wakes up on frames that are intended for the device.

Figure 8B:
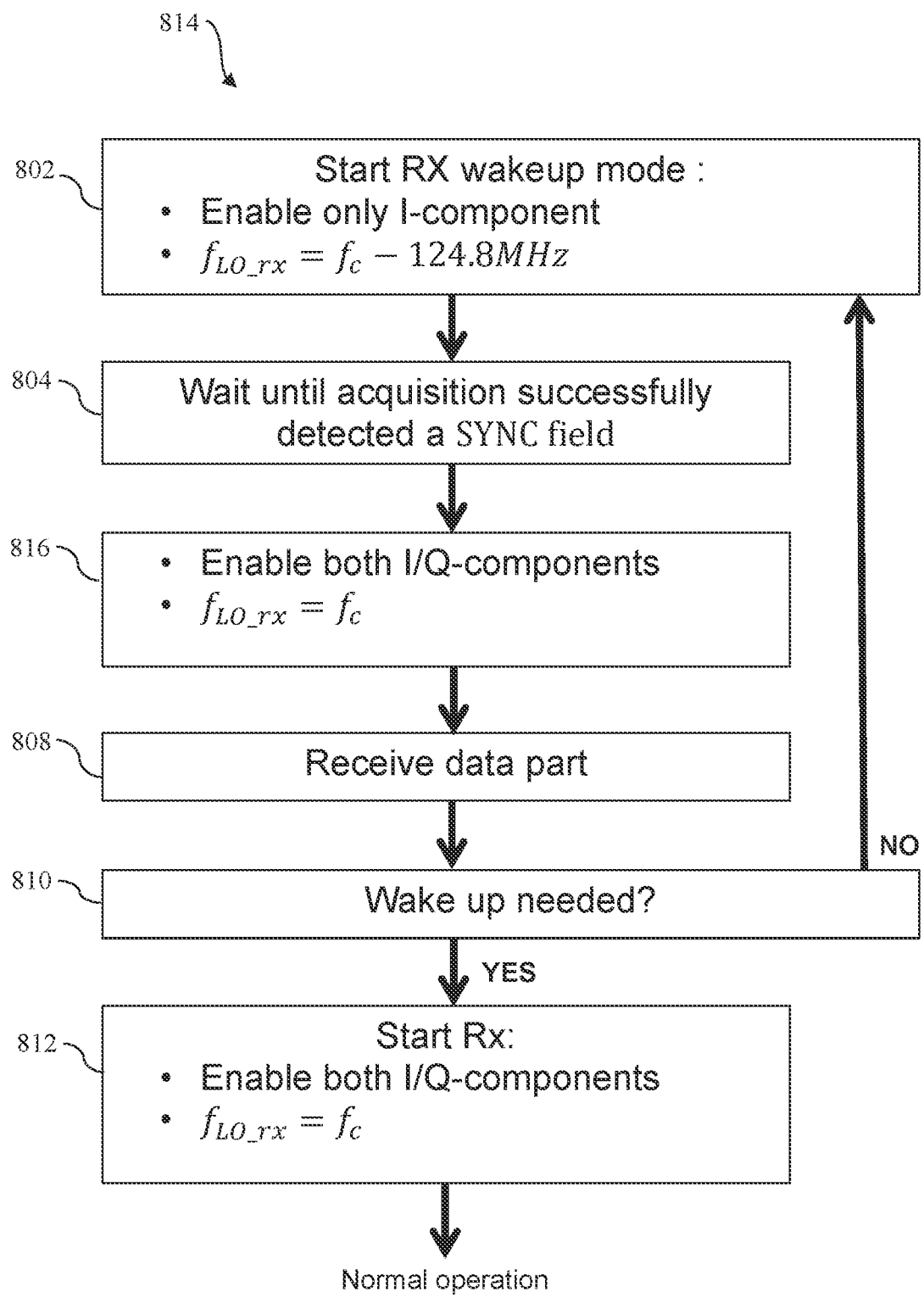
FIG. 8B shows an illustrative embodiment of a fourth procedure for operating a receiver circuit.

FIG. 8B shows an illustrative embodiment of a fourth procedure 814 for operating a receiver circuit. In particular, an alternative of the third procedure is shown. As mentioned above, in accordance with the present disclosure, the receiver circuit operates in the real receiver mode (i.e., using only the I-channel or I-component) until a signal is successfully acquired. In the example shown in FIG. 8B, this is implemented in the following manner. At 802, the receiver circuit is started in a wake-up mode, in which only the I-component is enabled, with a certain frequency offset, to detect the SYNC field for any phase offset between TX and RX. At 804, the controller waits until a SYNC field is detected. As mentioned above, the successful acquisition of the signal may be based on the detection of a synchronization (SYNC) field within the signal. Then, at 816, both the I-component and the Q-component are enabled and the center frequency is reset (i.e., changed back to its original value). It is noted that changing back the center frequency at this point has the advantage that the data part of the first frame can be received with full sensitivity. Thus, in this example, the wake-up is performed using only the I-component, but the data part of the first frame is received using both the I-component and the Q-component. In this sense, it may be said that the receiver circuit is started in a wake-up mode using only the I-component, however with immediate data reception using both quadrature branches. More specifically, the reception of the SYNC field of the first frame partly wakes up the device, the Q-component is enabled immediately, such that the data part of the first frame is received 808 with both quadrature branches enabled but without a nominal LO frequency offset. A full wake-up is performed if the data part indicates that a wake-up is needed 810 (e.g., a destination address matches and a ranging exchange is started). Accordingly, the receiver circuit is started 812 and both the I-component and the Q-component may be enabled. Then, the following frames are received with full receiver performance without a nominal LO frequency offset.

Figure 9:
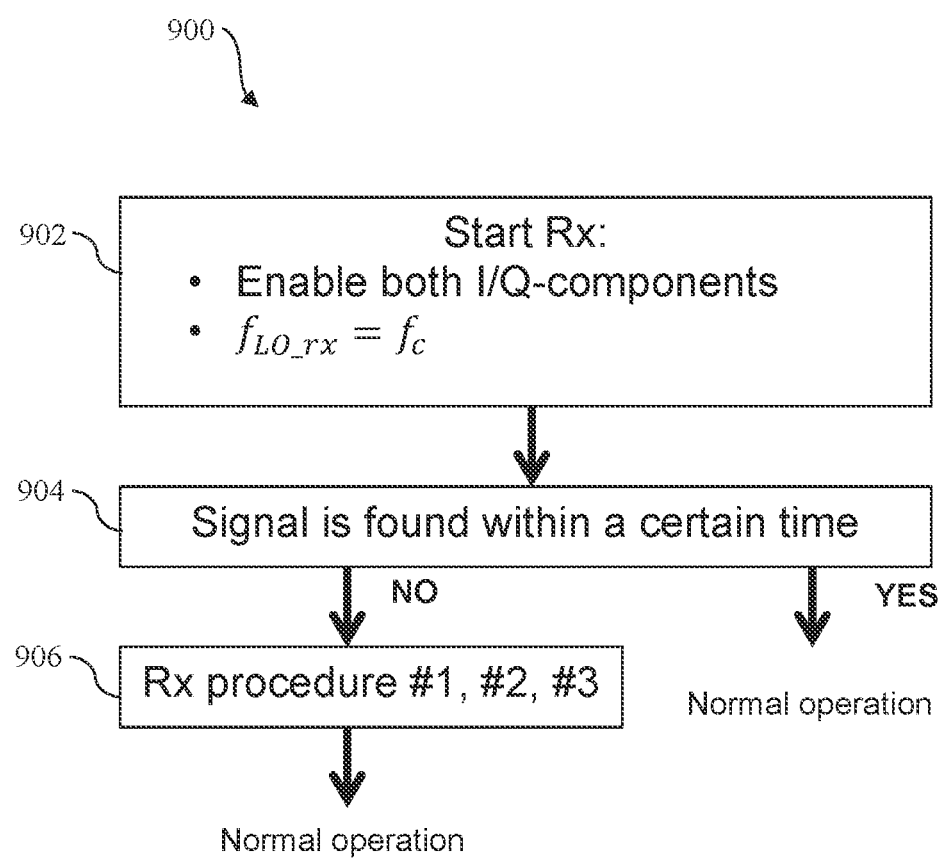
FIG. 9 shows an illustrative embodiment of a fifth procedure for operating a receiver circuit.

FIG. 9 shows an illustrative embodiment of a fifth procedure 900 for operating a receiver circuit. In particular, in accordance with the present disclosure, the receiver circuit operates in the real receiver mode (i.e., using only the I-channel or I-component) until a signal is successfully acquired. In the example shown in FIG. 9, this is implemented in the following manner. At 902, the receiver circuit is first started with full performance, i.e. with both the I-component and the Q-component enabled. If a signal is found within a certain time (i.e., a predefined amount of time), then the receiver circuit proceeds with its normal operation (i.e., regular operating mode). However, if no signal is found 904 within the predefined amount of time, then the first, second or third procedure as described above is executed 906. As explained above, in each of these procedures the Q-component is initially disabled, so that the receiver circuit effectively operates in the real receiver mode. This procedure is most suited for systems in which a wake-up event is triggered via a separate interface (e.g., a Bluetooth low energy interface), but in which the timing is only loosely defined by this interface and in which the link budget may not always be sufficient. For instance, this may be applicable if the communication device is a UWB anchor in a smart vehicle access system. In a smart access system for a car Bluetooth low energy (BLE) may be used as wakeup mechanism to turn on the UWB anchors on the car side. However, not all of them may have a sufficient UWB link budget for signal reception. Since the UWB anchors receive scheduling information in the first UWB frame, it is important that this frame is properly received. Anchors that do not receive this scheduling information, should remain in a constant receive mode for considerable amounts of time (i.e., minutes or hours). The aforementioned wake-up mode may reduce the BOM and the size of the UWB module. It is noted that the BOM and size of a UWB anchor are to a large extent determined by the constant receive mode, because a DC/DC converter may be needed instead of a cheap linear regulator to reduce current consumption. Furthermore, a larger module with a lower thermal resistance may be needed to avoid overheating. The energy consumption is reduced by switching to the wake-up mode, if no signal is found within a certain time. Accordingly, the sensitivity of the receiver circuit may be traded off against the BOM, size and energy consumption of the receiver circuit.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication device
102 receiver circuit
104 controller
200 method of operating a communication device
202 receiving, by a receiver circuit comprised in a communication device, a signal
204 controlling, by a controller comprised in the communication device, the receiver circuit, wherein the controller causes said receiver circuit to operate either in a complex receiver mode or in a real receiver mode, wherein the controller causes said receiver circuit to operate in the real receiver mode until the signal is successfully acquired
300 maximum amplitude of an I-component relative to an LO phase offset
400 field structure of a preamble
500 field structure of a full frame
600 first procedure for operating a receiver circuit
602 start receiver circuit in a wake-up mode
604 wait until acquisition successfully detected a SYNC field
606 wake up the receiver IC
608 start up the receiver circuit
700 second procedure for operating a receiver circuit
702 start receiver circuit in a wake-up mode
704 wait until acquisition successfully detected a SYNC field
706 receive data part
708 wake-up needed?
710 start up the receiver circuit
800 third procedure for operating a receiver circuit
802 start receiver circuit in a wake-up mode
804 wait until acquisition successfully detected a SYNC field
806 enable both the I-component and the Q-component
808 receive data part
810 wake-up needed?
812 start up the receiver circuit
814 fourth procedure for operating a receiver circuit
816 enable both the I-component and the Q-component and reset the center frequency
900 fifth procedure for operating a receiver circuit
902 start up the receiver circuit
904 signal is found within a certain time?
910 execute first, second or third procedure for operating the receiver circuit

The invention claimed is:

1. A communication device, comprising:
a receiver circuit configured to receive a signal;
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the controller is further configured to apply, when the receiver circuit operates in the real receiver mode, a local oscillator frequency which is different from a local oscillator frequency applied when the receiver operates in the complex receiver mode.

2. The device of claim 1, wherein the controller is further configured to cause the receiver circuit to use, in the complex receiver mode, an in-phase channel (I-channel) and a quadrature channel (Q-channel) of the received signal.

3. The device of claim 2, wherein the controller is further configured to cause the receiver circuit to use, in the real receiver mode, only said I-channel of the received signal or only said Q-channel of the received signal.

4. The device of claim 1, wherein the controller is further configured to switch the receiver circuit from the real receiver mode to the complex receiver mode upon or after a successful acquisition of the signal.

5. The device of claim 1, being an ultra-wideband (UWB) communication node acting as a responder in a communication system.

6. A communication device, comprising:
a receiver circuit configured to receive a signal;
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the controller is further configured to switch the receiver circuit from the real receiver mode to the complex receiver mode upon or after a successful acquisition of the signal;
wherein the successful acquisition of the signal is based on a detection of a synchronization field within said signal, wherein the synchronization field is included in a data frame.

7. The device of claim 6, wherein the controller is further configured to apply, when the receiver circuit operates in the real receiver mode, a local oscillator frequency which is different from a local oscillator frequency applied when the receiver operates in the complex receiver mode.

8. The device of claim 6, wherein the receiver circuit is configured to operate in the complex receiver mode by default, and wherein the controller is configured to switch the receiver circuit from the complex receiver mode to the real receiver mode if no signal is found within a predefined amount of time after the receiver circuit has started up.

9. A communication device, comprising:
a receiver circuit configured to receive a signal;
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the controller is further configured to switch the receiver circuit from the real receiver mode to the complex receiver mode upon or after a successful acquisition of the signal;
wherein the controller is further configured to wake up the receiver circuit before switching the receiver circuit from the real receiver mode to the complex receiver mode.

10. The device of claim 9, wherein the controller is further configured to apply, when the receiver circuit operates in the real receiver mode, a local oscillator frequency which is different from a local oscillator frequency applied when the receiver operates in the complex receiver mode.

11. A communication device, comprising:
a receiver circuit configured to receive a signal;
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the controller is further configured to switch the receiver circuit from the real receiver mode to the complex receiver mode upon or after a successful acquisition of the signal;
wherein the controller is further configured to wake up the receiver circuit after switching the receiver circuit from the real receiver mode to the complex receiver mode.

12. A communication device, comprising:
a receiver circuit configured to receive a signal:
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the controller is further configured to switch the receiver circuit from the real receiver mode to the complex receiver mode upon or after a successful acquisition of the signal;
wherein the controller is further configured to reset a center frequency upon or after switching the receiver circuit from the real receiver mode to the complex receiver mode.

13. The device of claim 12, wherein the receiver circuit is configured to operate in the complex receiver mode by default, and wherein the controller is configured to switch the receiver circuit from the complex receiver mode to the real receiver mode if no signal is found within a predefined amount of time after the receiver circuit has started up.

14. A communication device, comprising:
a receiver circuit configured to receive a signal;
a controller configured to control said receiver circuit, wherein said controller is configured to cause said receiver circuit to operate either in a complex receiver mode or in a real receiver mode;
wherein the controller is configured to cause said receiver circuit to operate in the real receiver mode until the signal is successfully acquired;
wherein the receiver circuit is configured to operate in the complex receiver mode by default, and wherein the controller is configured to switch the receiver circuit from the complex receiver mode to the real receiver mode if no signal is found within a predefined amount of time after the receiver circuit has started up.

15. The device of claim 14, wherein the controller is further configured to apply, when the receiver circuit operates in the real receiver mode, a local oscillator frequency which is different from a local oscillator frequency applied when the receiver operates in the complex receiver mode.

16. A method of operating a communication device, wherein the communication device comprises a receiver circuit and a controller, the method comprising:
receiving, by the receiver circuit, a signal;
controlling, by the controller, the receiver circuit;
wherein the controller causes said receiver circuit to operate either in a complex receiver mode or in a real receiver mode;
wherein the controller causes said receiver circuit to operate in the real receiver mode until the signal is successfully acquired;
wherein the controller applies, when the receiver circuit operates in the real receiver mode, a local oscillator frequency which is different from a local oscillator frequency applied when the receiver operates in the complex receiver mode.

17. The method of claim 16, wherein the controller causes the receiver circuit to use, in the complex receiver mode, an in-phase channel (I-channel) and a quadrature channel (Q-channel) of the received signal.

18. The method of claim 17, wherein the controller causes the receiver circuit to use, in the real receiver mode, only said I-channel of the received signal or only said Q-channel of the received signal.

19. The method of claim 16, wherein the controller switches the receiver circuit from the real receiver mode to the complex receiver mode upon or after a successful acquisition of the signal, wherein the successful acquisition of the signal is based on a detection of a synchronization field within said signal, wherein the synchronization field is included in a data frame.

20. The method of claim 16, wherein the controller switches the receiver circuit from the real receiver mode to the complex receiver mode upon or after a successful acquisition of the signal, wherein the controller wakes up the receiver circuit before switching the receiver circuit from the real receiver mode to the complex receiver mode.

* * * * *